3,560,475
		Patented Feb. 2, 1971

3,560,475
PROTHROMBIN COMPLEX PREPARED BY PRECIPITATION WITH POLYETHYLENE GLYCOL
Lajos F. Fekete, Valinda, and Edward Shanbrom, Santa Ana, Calif., assignors to Baxter Laboratories, Inc., Morton Grove, Ill.
No Drawing. Filed June 19, 1969, Ser. No. 834,883
Int. Cl. C07g 7/00
U.S. Cl. 260—112				7 Claims

ABSTRACT OF THE DISCLOSURE

A prothrombin complex prepared from a plasma fraction containing Factors II, VII, IX and X by adsorption with tribasic calcium phosphate, elution with trisodium citrate, and multiple precipitations with polyethylene glycol.

---

This invention relates to a method of making a novel prothrombin complex containing the coagulation factors: prothrombin (Factor II), proconvertin (Factor VII), antihemophilic factor B (Factor IX) and Stuart-Prower factor (Factor X).

The process of blood coagulation is a complicated physiological activity and involves the interaction of numerous substances found in normal whole blood. It is known that certain factors associated with the blood coagulation mechanism are absent or seriously deficient in certain individuals. Among these substances is antihemophilic factor B (Factor IX), which is also known as plasma thromboplastin component (PTC) or Christmas Factor. In individuals suffering from the congenital hemophilia known as hemophilia B, the blood is partially or totally devoid of this factor.

Several other factors which are important in the coagulation mechanism are Factors II, VII and X. As with Factor IX, these other factors also are deficient or absent in certain individuals.

It has been previously recognized that a plasma concentrate containing a combination of several or all of the foregoing factors would be highly useful in the treatment of patients deficient in these factors. Thus, a prothrombin complex prepared from fresh plasma by barium sulfate adsorption is described by Fowell, U.S. Pat. 2,999,791 and by tricalcium phosphate adsorption by Soulier et al., La Presse Medicale, vol. 72, pp. 1223–28 (1964). Bidwell et al., Brit. J. Haemat., vol. 13, pp. 568–80 (1967), describe the preparation of a prothrombin complex from a fraction rich in globulins which is referred to as $G_2$. The $G_2$ fraction is obtained by Bidwell by alcohol precipitation of plasma and is further fractionated to obtain a prothrombin complex by tricalcium phosphate adsorption and diethyl ether treatment at low temperatures.

It is an object of the present invention to provide a new method for the preparation of a prothrombin complex.

It is another object of the present invention to provide a new prothrombin complex of high potency for intravenous and intramuscular injection.

Other objects of the invention will be apparent to those skilled in the art.

As used herein, the term "prothrombin complex" refers to a concentrate of blood proteins which are active in the coagulation process comprising principally Factors II, VII, IX and X.

In accordance with the present invention, a novel prothrombin complex is prepared from a plasma fraction containing Factors II, VII, IX and X, preferably a Cohn Plasma Fraction selected from the group consisting of II+III, III, III–0, IV–1, and IV–1+IV–4. These Cohn fractions are essentially alpha, beta and/or gamma globulin fractions of blood plasma obtained by successive precipitations with cold ethanol and are further described in J. Am. Chem. Soc'y., vol. 68, pp. 495–575 (1946).

A unique advantage of the present invention is that the Cohn Plasma Fractions which can be used as starting material can be obtained from outdated plasma as well as fresh plasma. Thus, an outdated plasma fraction which would otherwise be discarded can be employed as a starting material in this invention.

In the preferred method of the present invention, the Cohn Plasma Fraction, most preferably IV–1, is suspended in normal physiological saline (ca. 0.9% saline), the pH is adjusted to about 6.8 to about 7.2, and tribasic calcium phosphate is thoroughly mixed with the suspension to adsorb the coagulation factors. The resultant tribasic calcium phosphate adsorbed-protein precipitate is then thoroughly mixed with from about 0.05 M to about 0.2 M trisodium citrate followed by recovery of the resulting supernatant which contains the desired coagulation factors. The supernatant, preferably after the addition of a calcium ion sequestrant, is subjected to a succession of two polyethylene glycol precipitations, first at a pH of from about 6.8 to about 8.0 and to a final concentration of from about 5% to about 10% polyethylene glycol with retention of the resulting supernatant, and then at a pH of from about 5.0 to about 5.4 and to a final concentration of at least about 20% polyethylene glycol by weight of said retained supernatant with retention of the resulting precipitate. The precipitate, which contains the active prothrombin complex, is then preferably suspended in citrated saline to a final volume of from about one twenty-fifth to about one tenth the volume of the suspension of the starting Cohn Plasma Fraction.

After suspension of the starting material has been achieved in the method of the present invention, the adsorption of the coagulation factors is carried out by adjusting the pH of the suspension to within a range of from about 6.8 to about 7.2 followed by adding a small amount of tribasic calcium phosphate. The tribasic calcium phosphate used in this invention is a polymeric type material which can be described by the formula $10CaO \cdot 3P_2O_5 \cdot H_2O$ and, alternatively, by the formula $Ca_{10}(OH)_2(PO_4)_6$. The use of from about 0.5% to about 2% by weight of tribasic calcium phosphate has been found to be suitable for the adsorption of the coagulation factors and a concentration of about 1% is preferred. The tribasic calcium phosphate preferably is allowed to mix with the suspension for about 15 to about 30 minutes in order to provide for substantially maximum adsorption of the coagulation factors.

The tribasic calcium phosphate adsorbed-protein precipitate is separated by centrifugation and then suspended in trisodium citrate, preferably to a volume of from about $\frac{1}{10}$ to about $\frac{1}{200}$ the volume of the original starting material. An aqueous solution of up to about 0.005 molar trisodium citrate can optionally be used for the elution of undesirable contaminating proteins, when present, whereas from about 0.05 to about 0.2 molar trisodium citrate is used for elution of the coagulation factors from the tribasic calcium phosphate adsorbent. The precipitate preferably is suspended in the trisodium citrate with constant stirring for about 15 to about 30 minutes in order to provide for substantially maximum elution of the respective contaminating proteins and the desired coagulation factors. Separation of these substances from the tricalcium phosphate particles is preferably carried out by centrifugation with constant stirring during the centrifugation.

After removal of the tribasic calcium phosphate precipitate, it is preferred that a calcium ion sequestrant, for example, the disodium salt of ethylenediaminetetraacetic acid (EDTA), be added to the solution. About 3 to 4 grams per liter of the disodium salt of EDTA (0.01 M) are preferred.

The polyethylene glycol used as a precipitating agent in this invention is a high molecular weight polymer which is generally produced by reacting ethylene oxide with ethylene glycol or water and has the following structure:

$$HO(C_2H_4O)_nC_2H_4OH$$

in which $n$ represents the average number of oxyethylene groups. According to the present invention the polyethylene glycol should be nontoxic and can range in molecular weight from about 200 to about 20,000. It preferably has a molecular weight of from about 400 to about 6,000. PEG 4000, which is a polyethylene glycol product having an average molecular weight of about 4,000, is the preferred product of this group. The precipitation with these polyethylene glycol polymers is preferably conducted at normal room temperature (about 25° C.).

After carrying out the two successive polyethylene glycol precipitations, the resuspended polyethylene glycol precipitate, which contains the active prothrombin complex, is preferably lyophilized or freeze-dried after the addition of an anticoagulant, for example, heparin, in amount of from about 1 to about 10 units per ml. (U.S. Pharmacopoeia units), adjustment of the pH to about 6.8, and filtering to remove any undesired particles and at the same time to obtain a sterile product without heating. The dry, lyophilized product is stable and can be reconstituted with water prior to use for intravenous, subcutaneous or intramuscular administration. Intravenous, subcutaneous or intramuscular administration of the prothrombin complex is useful to correct temporarily Factors II, VII, IX and X in persons deficient in such factors, to stop bleeding episodes, and/or prevent expected bleeding episodes, for example, bleeding disorders associated with liver disease and hemorrhagic diseases of the newborn.

If the starting material employed in the herein-defined method contains insoluble particles, plasminogen or lipids, such as with Cohn Plasma Fraction III and III-0, it is important that an additional precipitation step with polyethylene glycol be initially carried out after the starting material has gone into suspension. After suspension has been achieved, the pH is adjusted to a range of from about 4.6 to about 7.2, polyethylene glycol is added to a concentration of from about 1.5% to about 10%, and the suspension is centrifuged. This precipitation step removes the aforesaid undesirable materials and various other contaminating proteins carried over from the preceding fractionation procedure employed to prepare these fractions. When Cohn Plasma Fraction III paste is used as the starting material, the initial pH of the suspension is about 5.4 and the precipitation with polyethylene glycol is preferably accomplished by lowering the pH of this suspension to a value of from about 4.6 to about 5.2, most preferably about 4.8, with an acid reagent and mixing into the suspension polyethylene glycol to a final concentration of from about 1.5% to about 3.5%, most preferably about 2.5%, by weight.

A preferred alkaline reagent for pH adjustment in the method of the present invention is an aqueous solution of about 1 N sodium hydroxide. Other conventional alkaline reagents, for example, sodium bicarbonate, can be used in place of sodium hydroxide. A preferred acid reagent for pH adjustment, when required, is an aqueous solution of about 1 N hydrochloric acid.

The following examples will further illustrate the invention, although the invention is not limited to these specific examples. All parts and percentages herein are on a weight per volume basis unless otherwise specified.

EXAMPLE 1

Cohn Plasma Fraction IV-1 is suspended in normal physiological saline to a concentration of 10% (weight/volume) and the pH adjusted to 7.2 with 1 N NaOH. 500 grams of tribasic calcium phosphate is then added to 50 liters of the Fraction IV-1 suspension and the mixture stirred for about 30 minutes. The suspension is then centrifuged and the supernatant discarded. The retained precipitate is suspended in 0.1 M trisodium citrate to a final volume of 5 liters. The suspension is again centrifuged and the precipitate discarded. The pH of the retained supernatant (about 5 liters) is then adjusted to 7.2 with 1 N HCl, polyethylene glycol 4000 is added to a final concentration of 5%, and the suspension stirred for about 30 minutes. The suspension is clarified by centrifugation, with retention of the supernatant and discarding of the precipitate. The pH of the retained supernatant is then adjusted to 5.2 with 1 N HCl, and polyethylene glycol 4000 is added to a final concentration of 20%. The suspension is centrifuged and the precipitate that is recovered is dissolved in citrated saline (1 part 0.1 M trisodium citrate to 4 parts 0.9% sodium chloride) to a final volume of 2 to 5 liters, which is equivalent to $\frac{1}{25}$ to $\frac{1}{10}$ the volume of the original Fraction IV-1 suspension. Heparin is added in an amount of 1 unit per ml., and the solution is clarified and sterilized by passage through a combination of graded pore sizes of membrane filters. The solution is filled under aseptic conditions in 10 to 30 ml. sterile bottles, freeze dried and capped with stoppers. The freeze-dried material can be reconstituted with sterile water and then administered intravenously, subcutaneously or intramuscularly to patients who are deficient in one or more of the above-mentioned coagulation factors, particularly Factor IX. The Factor IX activity of the reconstituted product is about 20 times as great as an equal volume of normal whole plasma and is contained in about one eighteenth the amount of protein in normal whole plasma.

EXAMPLE 2

Cohn Plasma Fraction III paste from fresh plasma is suspended in 0.85% saline to a volume equal to ⅕ the original plasma volume and stirred to obtain homogeneous suspension. The pH of the suspension is then adjusted to 4.8 with a 1 N aqueous solution of hydrochloric acid. The suspension is centrifuged, and to the resulting supernatant, polyethylene glycol 4000 is added to a concentration of 2.5%. After mixing for thirty minutes, the suspension is centrifuged, and the pH of the supernatant is adjusted to 7.0 with 1 N NaOH. Tribasic calcium phosphate N.F. is added to the supernatant to a concentration of 1%. The resultant tribasic calcium phosphate precipitate is then suspended in 0.005 M trisodium citrate to a volume equal to $\frac{1}{200}$ the original Cohn Fraction III volume. After mixing for an interval of thirty minutes at 5° C., the suspension is centrifuged to remove undesired contaminating materials in the resulting supernatant. The retained precipitate is then suspended in 0.2 M trisodium citrate to a volume equal to $\frac{1}{200}$ the original Cohn Fraction III volume. After mixing for an interval of thirty minutes at 5° C., the suspension is centrifuged to remove the tribasic calcium phosphate particles. The disodium salt of ethylenediaminetetraacetic acid is added to the supernatant to a molarity of 0.01 with respect to the disodium EDTA and the pH is adjusted to 6.8 with 2 N acetic acid. PEG 4000 is added to provide a final concentration of 10%. The precipitate that forms is discarded. The supernatant is then adjusted to pH 5.2 and sufficient PEG 4000 is added to provide a final concentration of 20%. This suspension is centrifuged and the precipitate that is recovered is dissolved in citrated saline (one part of 0.1 M sodium citrate to 9 parts of a 5% sodium chloride solution) to a volume to provide 40 units of Factor IX per ml. The pH is adjusted to 6.8 with 1 N sodium hydroxide. Heparin in an amount of 3 units per ml. is added, and the solution is filtered through a series or combination of graded pore sizes of Millipore filters. The solution is filled under aseptic conditions into sterile 100 ml. glass bottles in units of 20 ml. of solution per bottle. After shell-freezing and drying from the frozen state under aseptic conditions, the bottles are closed with sterile stoppers under vacuum and capped. The dry product prepared in accordance with this example can be used for intravenous or intramuscular injection after reconstitution with 20 ml. of sterile water per each unit of dry product.

EXAMPLE 3

Example 2 is repeated except that the Cohn Plasma Fraction III paste is obtained from outdated plasma instead of fresh plasma. The plasma is obtained from a plasma pool ranging in age from two weeks to two months and stored at −25° C. for various periods of time ranging up to nine weeks before processing in accordance with the procedure of example 1. The prothrombin complex prepared in this manner is assayed after reconstitution with sterile water as follows:

(a) Factor II content.—The solution is assayed for prothrombin activity by the methods of Ware and Seegers, Am. J. Clin. Pathol., vol. 19, pp. 471–82 (1949) and Wagner et al., Blood Coagulation, Hemorrhage and Thrombosis, edited by Tocantins and Kazal, published by Grune and Stratton, New York, pp. 159–165 (1964).

(b) Factor IX content.—The solution is assayed for PTC activity according to the kaolin-activated partial thromboplastin time correction method described in the "Hyland Reference Manual of Coagulation Procedures," published by Hyland Laboratories, Los Angeles, Calif., pp. 19–21 (2d ed. 1964).

(c) Thrombin activity.—The presence of thrombin is tested for by determining the clotting time of recalcified normal plasma at various dilutions according to the procedure of Bidwell and Dike, Treatment of Hemophilia and Other Coagulation Disorders, edited by Biggs and MacFarlane, published by F. A. Davis Co., Philadelphia, pp. 62–69 (1966).

(d) Total protein content.—Total protein content is determined by ultraviolet absorption at a wavelength of 280 m$\mu$.

By the above assay procedures, the prothrombin complex of this example was found to be free of thrombin activity and to contain (on the average of many lots) about 8 mg. of protein per ml. The average Factor IX activity of these lots was about 20 to 40 times that of an equivalent volume of normal whole plasma; the average Factor II activity of these lots was about 5 to 15 times that of an equivalent volume of normal whole plasma. Since normal whole plasma contains about 70 mg. of protein per ml. the Factor IX activity in the prothrombin complex of this example is contained in only about one two-hundredths to one four-hundredth ($\frac{1}{200}$ to $\frac{1}{400}$) the amount of protein present in plasma providing an equal amount of Factor IX activity and the Factor II activity is contained in only one-fiftieth to one hundred fiftieth ($\frac{1}{50}$ to $\frac{1}{150}$) the amount of protein present in plasma providing an equal amount of Factor II activity.

The prothrombin complex of the above example also contains high activity levels of Factors VII and X relative to the levels found in normal whole plasma. These factors are usually measured together in a determination of the proconvertin-Stuart-Prower complex.

Various other examples and modifications and adaptations of the foregoing examples will be apparent to those skilled in the art after reading the foregoing specification and the appended claims without departing from the spirit and scope of the invention. All such further examples, modifications and adaptations thereof are included within the scope of this invention.

What is claimed is:

1. The method of preparing a prothrombin complex comprising suspending a Cohn Plasma Fraction selected from the group consisting of II+III, III, III-0, IV-1, and IV-1+IV-4 in normal physiological saline, adjusting the suspension to a pH of from about 6.8 to about 7.2, thoroughly mixing the supernatant with tribasic calcium phosphate to adsorb the coagulation factors, thoroughly mixing the tricalcium phosphate adsorbed-protein precipitate with from about 0.05 M to about 0.2 M trisodium citrate followed by recovery of the resulting supernatant, and then subjecting the recovered supernatant to a succession of two precipitations with polyethylene glycol having a molecular weight of from about 200 to about 20,00, first at a pH of from about 6.8 to about 8.0 and a final concentration of from about 5% to about 10% polyethylene glycol with retention of the resulting supernatant, and then at a pH of from about 5.0 to about 5.4 and a final concentration of at least about 20% polyethylene glycol by weight of said retained supernatant with retention of the resulting precipitate as the active prothrombin complex.

2. The method of claim 1 in which the polyethylene glycol has an average molecular weight of from about 400 to about 6,000.

3. The method of claim 1 in which the polyethylene glycol has an average molecular weight of about 4,000.

4. The method of claim 1 including the additional step of suspending the active prothrombin complex in citrated saline to a final volume of from about one twenty-fifth to about one tenth the volume of the suspension of the starting Cohn Plasma Fraction.

5. The method of claim 4 including the additional step of lyophilizing to provide a substantially dry product.

6. The method of claim 1 in which the Cohn Plasma Fraction is IV-1.

7. The method of claim 1 in which the Cohn Plasma Fraction is III and the starting saline suspension is initially subjected to an additional precipitation step with polyethylene glycol having a molecular weight of from about 200 to about 20,00 at a pH of from about 4.6 to about 5.2 and a final concentration of from about 1.5% to about 3.5%, with retention of the supernatant for the next step.

References Cited

UNITED STATES PATENTS

| 2,394,566 | 2/1946 | Smith et al. | 260—112X |
| 3,415,804 | 10/1968 | Polson | 260—112 |

FOREIGN PATENTS

| 603,998 | 6/1948 | Great Britain | 260—112 |

OTHER REFERENCES

Chem. Abstracts, vol. 66, 1967, 83733c, Shapiro et al.

WILLIAM H. SHORT, Primary Examiner

H. SCHAIN, Assistant Examiner

U.S. Cl. X.R.

424—101, 177

UNITED STATES PATENT OFFICE
CERTIFICATE OF CORRECTION

Patent No. 3,560,475           Dated February 2, 1971

Inventor(s) Lajos F. Fekete and Edward Shanbrom

It is certified that error appears in the above-identified paten and that said Letters Patent are hereby corrected as shown below:

In the claims, at col. 6, line 45, cancel "20,00" and insert --20,000--.

Signed and sealed this 1st day of June 1971.

(SEAL)
Attest:

EDWARD M. FLETCHER, JR.           WILLIAM E. SCHUYLER, J
Attesting Officer                 Commissioner of Patent